United States Patent [19]

Metivaud et al.

[11] Patent Number: 5,378,530
[45] Date of Patent: Jan. 3, 1995

[54] DEVICE FOR PROTECTION AGAINST FIRE, MADE OF ENDOTHERMIC FLEXIBLE MATERIAL

[75] Inventors: Guy Metivaud, Talence; Jean-Claude Decidour, Castelanau De Medoc; Michel Vignollet, Le Haillan, all of France

[73] Assignee: Societe Anonyme dite: Aerospatiale Societe Nationale Industrielle, Paris, France

[21] Appl. No.: 79,080

[22] Filed: Jun. 16, 1993

[30] Foreign Application Priority Data

Jun. 24, 1992 [FR] France ................. 92 07745

[51] Int. Cl.[6] ........................................ B32B 7/00
[52] U.S. Cl. ............................. 428/246; 428/36.1; 428/36.9; 428/36.91; 428/109; 428/247; 428/283; 428/284; 428/408; 428/447; 428/448; 428/902; 428/920; 428/921
[58] Field of Search ............... 428/247, 255, 283, 284, 428/260, 448, 408, 256, 266, 902, 920, 921, 447, 109, 36.1, 36.9, 36.91, 246

[56] References Cited

U.S. PATENT DOCUMENTS

4,273,821  6/1981  Pedlow .................. 428/215
5,047,449 10/1991  Pastureau ............... 523/179

FOREIGN PATENT DOCUMENTS

0391000 10/1990 European Pat. Off. .
1497659  1/1978 United Kingdom .
2120580 12/1983 United Kingdom .

Primary Examiner—James J. Bell
Attorney, Agent, or Firm—Marshall, O'Toole, Gerstein, Murray & Borun

[57] ABSTRACT

A device for protection against fire (G3), comprising a flexible body (A3) of material with endothermic properties, comprising a filler releasing vapor under the effect of fire.

According to the invention this device comprises, on at least that face of said body intended to be directed towards the fire, at least one layer (E3) of a fabric consisting of fire-resistant fibers and impregnated with an intumescent agent.

10 Claims, 2 Drawing Sheets

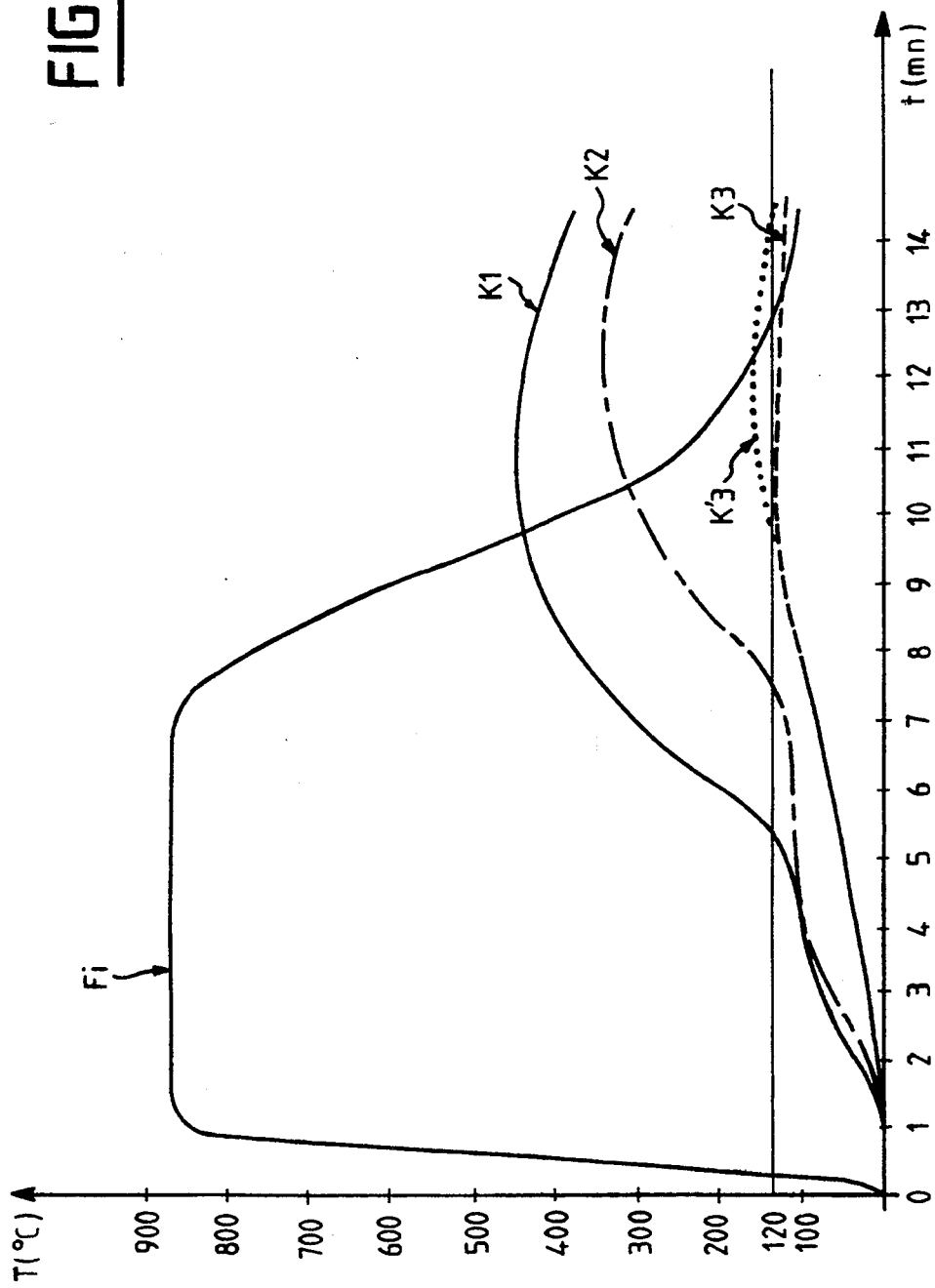

DEVICE FOR PROTECTION AGAINST FIRE, MADE OF ENDOTHERMIC FLEXIBLE MATERIAL

FIELD OF THE INVENTION

The present invention relates to a device for protection against fire, produced from a flexible material with endothermic properties.

PRIOR ART

A material for protection against fire incorporating an endothermic active filler such as borax (disodium tetraborate decahydrate) is already known from document FR-A-2,632,866. Under the effect of heat, this active filler decomposes, releasing water which vaporizes at the surface of said material. Since the vaporization takes place endothermally, this results in a lowering of the surface temperature of said material. Moreover, the intumescent properties of the material reinforce its insulating properties during thermal attacks.

When it is desired to produce a device for protection against fire (sheet, sheath, shell and the like) using such a material, a person is confronted with the difficulty stemming from the fact that, under the effect of fire, said material can in some cases break, with the result that pieces of said device become detached from its remainder, thus reducing the protection of the objects which are to be protected against fire by said protective device.

In some applications, furthermore, the fire-protection effect of such a material must be increased. To do this, it appears advantageous to reinforce the intumescence of said material. However, if an intumescent agent is incorporated into said material, the brittleness of the latter is increased because of the increase in the volume of the intumescent agent under the effect of fire. Furthermore, if the surface of said material is covered with an intumescent agent, for example in the form of paint, the adhesiveness of said intumescent agent to said material is very low, with the result that, under the effect of fire and/or of a mechanical deformation, the surface layer of said intumescent agent becomes at least partially separated from said protective device, leaving the material of the latter in direct contact with the fire with the degradation effects described above.

SUMMARY OF THE INVENTION

The objective of the present invention is to overcome these disadvantages and to make it possible to produce a device for protection against fire exhibiting improved endothermic and intumescent properties.

To this end, according to the invention, the device for protection against fire comprising a flexible body of material with endothermic properties comprising a filler releasing vapor under the effect of fire is noteworthy in that it comprises, on at least that face of said body which is intended to be directed towards the fire, at least one layer of a fabric consisting of fire-resistant fibers and impregnated with an intumescent agent.

Thus, said fabric serves as reinforcement for binding said intumescent agent onto the material with endothermic properties. The adhesiveness of said intumescent agent to said material is therefore particularly good. Furthermore, said fabric forms a mechanical reinforcement preventing said material with endothermic properties from deteriorating, piece by piece. Experience has shown that, under the effect of fire, the fabric impregnated with the intumescent agent forms a rigid and dilated shell which maintains the underlying endothermic material and whose porosity is sufficient to allow the vapor generated by said material with endothermic properties to pass through.

The fabric thus serves, simultaneously, for binding the intumescent agent onto the endothermic material and for maintaining the integrity of the latter, while permitting the release of the vapor generated by said endothermic material.

The fabric employed in making use of the present invention is preferably made of carbonizable preoxidized organic fibers which are capable of strongly absorbing the infrared heat flow from a fire. Such a fabric is preferably of the meshed type in order to offer high elasticity properties capable of permitting the swelling of the intumescent agent, and said organic fibers may be based on polyacrylonitrile. Other fibers, such as aramid fibers, may be envisaged to make the weaving easier. Such fabrics are, for example, manufactured and sold, under the trade name Montségur, by the Société Ariégeoise de Bonneterie, 09300 Montferrier, France.

Before impregnation of said fabric, said intumescent agent is advantageously in the form of an aqueous liquid and, after impregnation and drying, in the form of a flexible coating. Thus, said intumescent agent cannot release any toxic vapors under the effect of fire.

Such an intumescent arrangement may be that manufactured and sold, under the trade name Orgol FS, by the 3M Company, 95006 Cergy-Pontoise Cedex, France.

In order to produce the device for protection against fire in accordance with the present invention it is possible, separately, to manufacture the body of the flexible material with endothermic properties and to prepare the fabric impregnated with the intumescent agent, and then to join the latter integrally to said body. Such a joining is preferably carried out using a silicone adhesive, for example that sold under the trade name CAF 730, manufactured and sold by the French company Rhône-Poulenc. Such a silicone adhesive is advantageous, because it polymerizes in the presence of water and therefore in the presence of the preferred aqueous intumescent agent.

The silicone adhesive may be applied between the body of the material with endothermic properties and the fabric impregnated with the intumescent agent. It can also be mixed with said intumescent agent before impregnation of said fabric. In this latter case the impregnation of said fabric is done with a mixture of intumescent agent and of silicone adhesive comprising at least 15% by weight of silicone adhesive.

In an alternative form, the device for protection against fire in accordance with the present invention could be obtained by molding the body in flexible material with endothermic properties onto said fabric impregnated with the intumescent agent, preferably mixed with said silicone adhesive.

The filler incorporated into said material with endothermic properties and releasing water vapor under the effect of fire is preferably trisodium phosphate containing 12 molecules of water.

In order that said body may be easily molded to the desired shape (sheet, shell, sheath, tube and the like), said material comprises, in a manner known per se, a silicone binder. In addition, a refractory reinforcing filler, compatible with said silicone binder, may be provided.

A preferred composition for the material of said flexible body is the following:

| | |
|---|---|
| silicone elastomer binder, preferably that bearing reference RTV 141 from Rhône-Poulenc | 100 parts by weight |
| refractory reinforcing filler, preferably $TiO_2$ | 7 parts by weight |
| endothermic filler, namely trisodium phosphate containing 12 molecules of water | 110 parts by weight |
| catalyst for the silicone elastomer binder | 10 parts by weight |

To show the effectiveness against fire of the protective device in accordance with the present invention, tubular sheaths G1, G2 and G3 were manufactured for the protection of conduits, of which only sheath G3 is in accordance with the present invention, and comparative tests were carried out.

The attached figures are intended to illustrate these tests.

BRIEF DESCRIPTION OF THE DRAWINGS

FIG. 5 illustrates the results of thermal insulation tests conducted with the equipment of FIG. 4.

DETAILED DESCRIPTION

Figure 1:
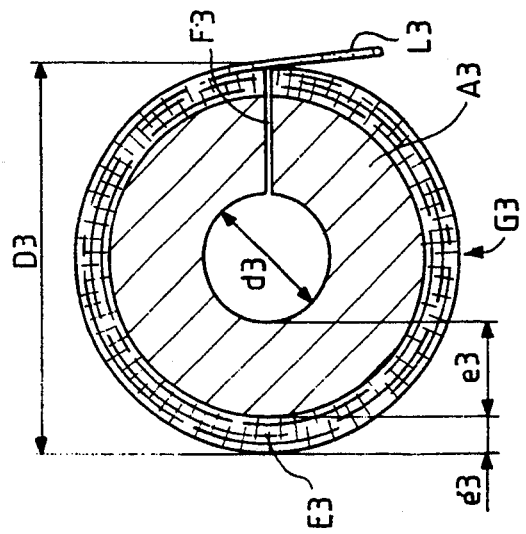
FIGS. 1, 2 and 3 are sections of fire protection sheaths G1, G2 and G3, manufactured with a view to comparative tests of thermal insulation.
Figure 2:
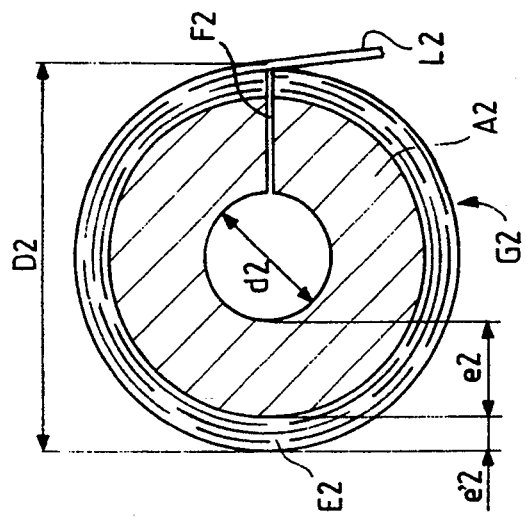
Figure 3:
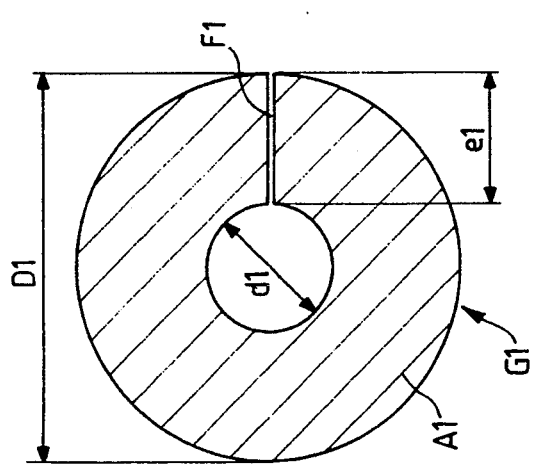

As illustrated in section by FIGS. 1, 2 and 3, three tubular sheaths G1, G2 and G3, intended to protect metal conduits against fire, are produced for the purpose of comparative tests.

Sheath G1 (see FIG. 1) consists solely of a body A1 of flexible endothermic material the composition of which is, for example, the following:

| | |
|---|---|
| silicone elastomer RTV 141 | 100 parts by weight |
| $TiO_2$ | 7 parts by weight |
| trisodium phosphate containing 12 molecules of water | 110 parts by weight |
| catalyst for the silicone elastomer | 10 parts by weight |

Sheaths G2 and G3 (see FIGS. 2 and 3) comprise flexible bodies A2 or A3, respectively surrounded superficially with a winding of meshed fabric E2 or E3 made of Montségur carbonizable preoxidized fibers.

The flexible bodies A2 and A3 are made of the same endothermic material as that constituting sheath G1 and the composition of which is given above.

The fabric winding E2 of sheath G2 is impregnated with silicone, whereas the fabric winding E3 of sheath G3 is impregnated with an intumescent product, for example that marketed under the trade name Orgol FS by the U.S. company 3M.

The flexible bodies A1, A2 and A3 are made by any known means, such as molding and injection. The windings E2 and E3 are adhesively bonded onto the bodies A2 and A3, for example with the aid of a silicone adhesive of the type of that marketed under the trade name CAF 730 by the French company Rhône-Poulenc, or else integrally joined to the said bodies A2 and A3 by injection molding inside said preformed windings.

Sheaths G1, G2 and G3 comprise lengthwise slits F1, F2 or F3, intended to allow said sheaths to be placed over a conduit by elastic deformation. The free end L2 or L3 of the winding E2 or E3 covers the slit F2 or F3 and is not integrally attached to the remainder of said winding.

In the examples being considered the outer diameters D1, D2 and D3 of the sheaths G1, G2 and G3 are 30 mm, whereas the respective inner diameters d1, d2 and d3 are 10 mm. As a result, the thickness e1 of sheath G1 is 10 mm. With regard to sheaths G2 and G3, their bodies A2 and A3 have a thickness e2 or e3 of 8 mm and their windings E2 and E3 a thickness e'2 or e'3 of 2 mm.

In order to test sheaths G1, G2 and G3, an apparatus (see FIG. 4) is available, comprising a tube Tu (of 10-mm outer diameter) closed at its ends by plugs B which are pierced with vents v, and a temperature probe S housed inside said tube Tu and connected to a thermometer Th on which the temperature measured by said probe S is displayed.

Any one of the sheaths G1, G2 and G3 can be placed over the tube Tu by introducing said tube Tu into the slit F1, F2 or F3. With regard to sheaths G2 and G3, the free ends L2 and L3 are integrally joined to the remainder of the winding E2 or E3 by adhesive bonding with the aid of a silicone adhesive, after placing over the tube Tu, in order to close the slits F2 or F3.

Figure 4:
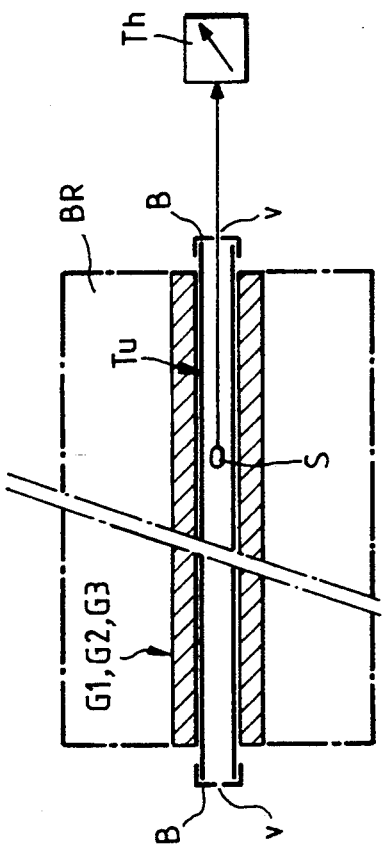
FIG. 4 shows diagrammatically an equipment which makes it possible to produce comparative tests of thermal insulation on the sheaths of FIGS. 1, 2 and 3.

The experimental apparatus further comprises a burner BR (symbolized by a rectangle using a line of dots and dashes in FIG. 4) capable of directing flames at a controlled temperature onto the sheath G1, G2 or G3 which is placed over the tube Tu.

In FIG. 5, (in which the abscissa axis shows the time t in minutes, and in which the ordinate axis shows the temperatures in degrees centigrade), curve Fi represents an example of fire applied to sheaths G1, G2 and G3 by the burner BR. As can be seen, the temperature T of this example of fire Fi changes in one minute from room temperature to nearly 900° C., is maintained at this temperature for about six minutes, and then decreases.

Curves K1, K2 and K3 in FIG. 5 show the change in temperature, measured by the probe S inside the tube Tu, when the sheaths G1, G2 and G3 respectively are subjected to the example of fire Fi. As can be seen, with sheaths G1 and G2, the temperature inside the tube Tu approaches 450° C. and 350° C. respectively. On the other hand, with sheath G3 in accordance with the invention, this temperature remains below 120° C.

Curve K'3 shows the variation in the temperature inside the tube Tu in the case of a sheath, in accordance with the invention and practically identical with sheath G3, in which the intumescent agent impregnating the winding E3 is not pure but is mixed with 15% by weight of a silicone adhesive intended to ensure the integral joining of the winding E3 onto the flexible body A3.

It is seen that the incorporation of the silicone adhesive in the intumescent agent impregnating the winding E3 (curve K'3) is less advantageous than the impregnation of the winding E3 with the pure intumescent agent, followed by adhesive bonding of the said winding onto the flexible body A3 (curve K3). However, even in this less advantageous case, the temperature inside the tube Tu does not exceed 150° C., which should be compared with the maximum temperatures reached by the curves K1 and K2.

What is claimed is:

1. A device for protection against fire comprising a flexible body made of a silicone material including an endothermic filler releasing which generates vapor under the effect of heat, said device comprising, on at least that face of said body which is intended to be directed towards the fire, at least one layer of a fabric consisting of fire-resistant fibers and impregnated with an intumescent agent and in which said impregnated fabric, when subjected to the effect of fire, exhibits a sufficient porosity to allow the vapor generated by said endothermic filler to pass through.

2. The device as claimed in claim 1, wherein said fabric is made of carbonizable preoxidized organic fibers.

3. The device as claimed in claim 2, wherein said fabric is of the meshed type.

4. The device as claimed in claim 1, wherein, before impregnation of said fabric, said intumescent agent is in the form of an aqueous liquid and, after impregnation and drying, in the form of a flexible coating.

5. The device as claimed in claim 1, wherein said fabric is integrally joined to the body by adhesive bonding with the aid of a silicone adhesive.

6. The device as claimed in claim 5, wherein said silicone adhesive polymerizes in the presence of water.

7. The device as claimed in claim 5, wherein said silicone adhesive is mixed with said intumescent agent before impregnation of said fabric.

8. The device as claimed in claim 1, wherein said filler is trisodium phosphate containing 12 molecules of water.

9. The device as claimed in claim 1, wherein said flexible body comprises a reinforcing refractory filler.

10. The device as claimed in claim 1, wherein the composition of the material of said flexible body is the following:

silicone elastomer binder 100 parts by weight
$TiO_2$ (reinforcing refractory filler) 7 parts by weight
trisodium phosphate containing 12 molecules of water 110 parts by weight
catalyst for the elastomer binder 10 parts by weight.

* * * * *

UNITED STATES PATENT AND TRADEMARK OFFICE
CERTIFICATE OF CORRECTION

PATENT NO.   : 5,378,530
DATED        : January 3, 1995
INVENTOR(S)  : GUY METIVAUD ET AL.

It is certified that error appears in the above-indentified patent and that said Letters Patent is hereby corrected as shown below:

Column 5, line 6, delete "releasing".

Signed and Sealed this

Twenty-fifth Day of April, 1995

Attest:

BRUCE LEHMAN

*Attesting Officer*            *Commissioner of Patents and Trademarks*